(12) United States Patent
Ricketts et al.

(10) Patent No.: US 8,221,064 B2
(45) Date of Patent: Jul. 17, 2012

(54) TRANSVERSE FAN ASSEMBLY HAVING A SUPPLEMENTARY AIR FEED INLET FOR INFILL OF AIR FLOW DEFICIENCIES TO EFFECT A DESIRED OUTPUT AIR FLOW PATTERN, AND METHOD OF USE THEREOF

(75) Inventors: Jonathan E. Ricketts, Ephrata, PA (US); Brandon P. Kolb, Cambridge, IL (US)

(73) Assignee: CNH America LLC, New Holland, PA (US)

( * ) Notice: Subject to any disclaimer, the term of this patent is extended or adjusted under 35 U.S.C. 154(b) by 874 days.

(21) Appl. No.: 12/313,175

(22) Filed: Nov. 18, 2008

(65) Prior Publication Data

US 2010/0124482 A1    May 20, 2010

(51) Int. Cl.
*F03B 1/04*    (2006.01)

(52) U.S. Cl. ....... 415/184; 415/53.1; 415/185; 415/203; 415/204; 415/205; 415/224.5

(58) Field of Classification Search ................. 415/53.1, 415/184, 185, 203, 204, 205, 224.5
See application file for complete search history.

(56) References Cited

U.S. PATENT DOCUMENTS

| | | |
|---|---|---|
| 1,548,341 A | 8/1925 | Bánki |
| 1,887,873 A | 11/1932 | Hagen |
| 3,322,332 A | 5/1967 | Laing ............................ 230/125 |
| 4,017,206 A | 4/1977 | Döge et al. .................... 415/102 |
| 4,078,870 A | 3/1978 | Keller et al. .................... 415/54 |
| 4,424,634 A * | 1/1984 | Westelaken ...................... 34/167 |
| 4,465,081 A | 8/1984 | Decoene et al. ................. 130/27 |
| 4,466,230 A | 8/1984 | Osselaere et al. ............... 56/10.2 |
| 5,094,586 A | 3/1992 | Takada et al. ................ 415/53.3 |
| 5,098,341 A | 3/1992 | Kuchar ........................... 460/99 |
| 5,165,855 A | 11/1992 | Ricketts et al. ............... 416/178 |
| 5,176,574 A | 1/1993 | Matousek et al. ........... 460/100 |
| 5,197,850 A | 3/1993 | Shinobu et al. .............. 415/53.1 |
| 5,449,271 A | 9/1995 | Bushnell et al. .............. 415/119 |
| 5,558,576 A | 9/1996 | Meyers .......................... 460/99 |
| 5,599,162 A | 2/1997 | Ricketts et al. .............. 415/53.1 |
| 5,868,551 A | 2/1999 | Smiley, III et al. .......... 415/53.1 |
| 6,341,643 B1 | 1/2002 | Osakabe ........................ 165/41 |
| 6,677,564 B1 | 1/2004 | Sohn et al. .................... 219/757 |
| 6,773,343 B2 | 8/2004 | Grywacheski et al. ......... 460/99 |
| 6,896,477 B1 | 5/2005 | Kertész ....................... 415/53.1 |
| 7,008,315 B2 | 3/2006 | Redekop et al. .............. 460/112 |
| 2005/0013685 A1 | 1/2005 | Ricketts et al. .............. 415/53.1 |
| 2006/0270473 A1 * | 11/2006 | Straeter .......................... 460/99 |
| 2008/0004090 A1 | 1/2008 | Ricketts ........................ 406/99 |
| 2008/0004091 A1 | 1/2008 | Ricketts ...................... 406/100 |
| 2008/0146299 A1 | 6/2008 | Matousek et al. ........... 406/100 |

FOREIGN PATENT DOCUMENTS

| | | |
|---|---|---|
| GB | 2054740 | 7/1979 |
| WO | 2005003568 | 1/2005 |

* cited by examiner

*Primary Examiner* — Ajay K Arora
(74) *Attorney, Agent, or Firm* — Michael G. Harms

(57) ABSTRACT

A transverse fan assembly, including for use with agricultural combine harvesters, which fan assembly includes a supplementary air feed inlet for the infill of air flow voids or deficiencies in the air flow pathway from the air inlet of the transverse fan assembly to the air inlet entryway so as to effect a desired, generally more uniform, output air flow pattern across the entire expanse of the air outlet of the transverse fan assembly, and a method of use thereof.

19 Claims, 8 Drawing Sheets

TRANSVERSE FAN ASSEMBLY HAVING A SUPPLEMENTARY AIR FEED INLET FOR INFILL OF AIR FLOW DEFICIENCIES TO EFFECT A DESIRED OUTPUT AIR FLOW PATTERN, AND METHOD OF USE THEREOF

TECHNICAL FIELD

The present invention relates generally to agricultural harvesters and, more particularly, to a transverse fan assembly for agricultural combine harvesters, which fan assembly has a supplementary air feed inlet therewith for the infill of air flow voids or deficiencies in the air flow pathway from the air inlet of the transverse fan assembly to the air inlet entryway so as to effect a desired, generally more uniform, output air flow pattern across the entire expanse of the air outlet, and a method of use thereof.

BACKGROUND ART

In the harvesting of crops it is desired that the grain be separated from other elements or portions of the crop, such as from pod or cob fragments, straw, stalks, and the like. Agricultural combines typically have employed a rotary threshing or separating system for separating and segregating the grain from such other crop elements or portions. In general, rotary threshing or separating systems are so designed that, as threshing occurs, the resulting crop material is typically caused to fall or be conveyed to a clean grain and tailings conveying system, sometimes also referred to as a collecting and conveying system, or even more simply as a conveying system, for further processing, which processing typically includes the feeding of such resulting crop material from the rotary threshing or separating system onto an underlying vibratory cleaning system or onto one or more conveyors for conveyance to such a cleaning system.

The cleaning system typically includes a set of stacked sieves or shoes that are reciprocally moved, usually in the fore and aft directions, to separate or sift the grain from tailings and material other than grain (MOG). With many combines, as the grain is cleaned from the MOG, it falls through the sieves and drops onto or into one or more underlying clean grain pans that are disposed below the sieves, which pans feed the clean grain to an intersecting, cross, generally laterally extending, clean grain conveyance trough, sometimes referred to as the clean grain auger trough or, more simply, the clean grain trough.

The laterally extending clean grain conveyance trough receives the clean grain conveyed thereto from the clean grain collecting troughs and typically has associated therewith a conveyance mechanism, often in the form of an auger extending therethrough, for moving and delivering the clean grain in such clean grain conveyance trough to an elevator that carries the clean grain up to a clean grain tank.

During the vibration of the sieves, air is blown upwardly and rearwardly through the sieves to carry lighter elements of the MOG, or chaff, away. The heavier elements and tailings that are too large to fall through the sieves and too heavy to be blown away are caused to be moved by the vibrations, generally rearwardly along the top surfaces of the sieves, towards and over rear edges of the sieves to fall onto a tailings pan located below and extending somewhat beyond such rear edges. The tailings pan, similarly to the clean grain pan, feeds the tailings to an intersecting, cross, generally laterally extending, tailings conveyance trough, sometimes referred to as the tailings auger trough or, more simply, the tailings trough.

The sidewardly extending tailings conveyance trough receives the tailings conveyed thereto from the tailings collecting pan and/or troughs and has a conveyance mechanism, often in the form of an auger extending therethrough, for moving and delivering the tailings to a tailings return conveyor operable for carrying the tailings upwardly, back to the cleaning or separating system of the combine, for reprocessing, including further threshing of the tailings.

For a number of years now, transverse or cross-flow fans of various designs have been advantageously employed with agricultural combines to provide the air that is blown upwardly and rearwardly through the sieves to carry the chaff away from the grain and tailings deposited onto the cleaning system sieves. Such chaff is typically blown into an optional chaff spreader, operable for distributing the chaff over a desired swath of the field from which the crop is cut, or directed into an optional chopper, operable for mixing the chaff with straw for chopping and distributing such mix, or simply directed downwardly onto the field through a rear opening of the combine.

Transverse or cross-flow fan assemblies are well known in the art, and such fan assemblies typically have included axially spaced disk-like members that support a plurality of elongated fan blades in some form of cylindrical pattern or array, often with as many as thirty-six fan blades disposed in a cylindrical arrangement about the axis of rotation of the fan. With some fan assemblies, straight and cross-sectionally curved fan blades have been disposed with the tips of the blades extending generally parallel to the axis of rotation, which fan blade configurations are generally hereinafter referred to as axially aligned fan blade arrangements. In more recent years, in efforts to reduce fan noise, newer types of transverse fan assemblies have been developed in which the fan blades in a number of fan assemblies have, instead, been angled. One example of a transverse fan assembly that has been advantageously employed in combines and which utilizes an angled blade arrangement, with the fan blades disposed in a chevron blade arrangement, is found in U.S. Pat. No. 5,599,162.

Transverse fans have proven particularly useful in combine cleaning systems because such fans can produce a wide stream of air that can be directed upwardly toward the cleaning sieves of the combine cleaning systems but require relatively little space. Such fans, in typical agricultural combines, are disposed such that their air outputs are below the sieves of the cleaning system, and, so, are positioned close to the ground over which the combine moves.

As will be appreciated, rocks and other debris commonly found in fields can be detrimental to the normal high speed rotational operation of fan blades, and broken and/or bent fan blades can affect fan performance, and consequently, the overall efficiency of a combine in which a transverse fan assembly is installed. Accordingly, when transverse fan assemblies are employed with typical combines, the fan blades are normally protected by installing the fan within a fan wrapper or air plenum, with the fan being rotatably mounted within an inner chamber of the air plenum to operably drive air between an air inlet and an air outlet.

Desirably, such transverse fans, as employed in combines, will provide a relatively wide output of air, of preferably uniform or consistent flow along the expanse of the fan. Unfortunately, inconsistencies in the flow of output air can arise for various reasons, including due to "end effect" air characteristics and the existence or occurrence of obstructions in the air pathway through the air inlet to the air inlet entryway.

In general, especially for straight-bladed transverse fan assemblies whose fan blades are disposed in axially aligned fan blade arrangements, as the fan rotates forwardly air is drawn in an air flow pathway through the air inlet towards the air inlet entryway at the leading edge of the air plenum where such leading edge is disposed closely adjacent to the outer periphery of the rotating fan, and thereafter through the fan to the air outlet, all in approximately the same line. Thus, if a volume of air enters 10 inches from the end of the fan, it will be expected to exit approximately 10 inches from the end of the fan.

For fan assemblies that, instead, have a chevron blade pattern, air is drawn in an air flow pathway into the fan in much the same fashion, but, to improve fan performance by lessening end air effects while still providing a generally uniform air distribution across the expanse of the fan, the resultant flow of air off of the fan blades as the fan rotates forwardly is directed somewhat outwardly toward the fan ends, thereby perhaps occasioning some slight shift in the air flow path from the air inlet to the air outlet. In some instances, improvement in the air flow volume realized at the ends of the fan may thus result in some degradation in the air flow volume near the center of the fan.

Additionally, the existence or occurrence of an obstruction in some area of air pathway to the air inlet entryway will affect the air flow volume being provided to the fan downstream from such obstruction, resulting in an air flow void or deficiency or discrepancy at locations along the expanse of the fan as inlet air is being provided thereto, thus impacting the corresponding air flow volume at the air outlet and resulting in undesirable non-uniformity in air flow volume along the expanse of the fan and a lessened efficiency in the operation of the cleaning section and in the separation of the chaff from the other crop materials. For purposes of further discussion herein, reference to an air flow void should be considered to encompass not only a lack or absence of air flow at a particular location but also any lessened or deficient air flow at that particular location, and should be broadly construed.

Desirably, then, it has been recognized that it would be beneficial if additional air flow could be introduced into the air inlet, or the air pathway to the air inlet entryway, especially into an area of deficient air flow volume, to effect such an air flow distribution into the fan across the expanse of the fan that a more uniform air flow can be realized at the air outlet. Unfortunately, it has been found that simply introducing air into the air pathway from the opposite ends of the fan does not result in the desired uniformity of air flow because the air flow from the opposite ends across the fan undesirably disrupts the fan output.

Consequently, there has remained a desire for a transverse fan assembly that permits and provides for the supply and introduction of supplementary air into the air inlet for the fan in such a way that infill of air flow voids or deficiencies in the air flow pathway can be effected so as to effect a desired, generally more uniform, output air flow pattern across the entire expanse of the fan instead of undesirably disrupting the fan output. Combine operators have continued to seek such a fan construction and a method of use thereof that can provide the more uniform flow of air desired, including in the event of obstructions in the air pathway to the air inlet entryway to the fan, which construction preferably will also include features for selectably altering to some extent the air flow volume introduced into the fan at one or more locations along the expanse of the fan.

SUMMARY OF THE INVENTION

What is now disclosed is a transverse fan assembly that may be employed in combine harvesters and which addresses such desires. Such transverse fan assembly includes an air plenum construction having a fan rotatably disposed therein between an air inlet and an air outlet, the air plenum including a leading edge closely adjacent to the outer periphery of the fan, such leading edge and the outer periphery of the transverse fan defining an air inlet entryway into which air is drawn in an air flow pathway through the air inlet into the fan as the fan is rotated forwardly, the forward rotation of the fan drivingly forcing such drawn air in an output flow from the air outlet, and a supplementary air feed inlet, sometimes referred to more simply as a supplementary air inlet, that is in communication with the air inlet of the air plenum across a first portion of the expanse of the fan for the infill of air flow into the air flow pathway towards the air inlet entryway to compensate for voids or deficiencies in the air flow pathway through the air inlet towards the air inlet entryway at the air inlet entryway so as to effect a desired, generally more uniform, output air flow pattern across the entire expanse of the fan and/or the air outlet, and a method of use thereof.

In one preferred embodiment, the supplementary air feed inlet of the transverse fan assembly includes an elongated channel or chamber that extends generally transversely across the width of the air plenum generally parallel to the air inlet and the air inlet entryway and which is open at its opposite ends to permit air to be drawn into the chamber through such open ends. The chamber is open along a first portion of one side thereof, as at one or more apertures along such one side, to be in communication with the air inlet and the air flow pathway through the air inlet to the air inlet entryway. Such one side may include one or more separation members disposed therealong, non-apertured portions of which separation members separate such chamber and the air supply along at least a second portion of such one side of the chamber.

In one of the more basic forms of the invention, a pair of separation members are disposed extending from the opposite ends of the chamber towards the center thereof, with a center portion of the chamber being in communication with the central portion of the air inlet and the air flow pathway therethrough to the central portion of the air inlet entryway, whereby an increased air flow volume can be drawn through the ends of the chamber and introduced to the central portion of the air inlet as the fan rotates, thereby providing enhanced air flow at the central portion of the air inlet entryway.

In another form of the invention, the separation member or members may be repositionable to alter or vary the portions of the chamber that are either in communication with or closed to the air inlet and the air flow pathway therethrough to the air inlet entryway, thereby permitting the air flow volume to the fan to be selectably enhanced at one or more differentiable locations along the expanse of the fan.

Optionally, air flow monitors may be installed downstream from the fan at a plurality of locations across the expanse of the fan and/or the air outlet to determine the air flow volume at particular locations. Dependent in part upon the detected air flow volumes, the separation member or members may be repositionable to effect a more desirable air flow pattern across the expanse of the fan and/or at the air outlet.

It is also preferred that the transverse fan be configured to minimize fan noise, such as by employing elongated fan blades that slant toward a peripheral center portion of the fan such that opposite end portions of each elongated fan blade are arranged in substantial axial alignment relative to each other, while the center portion of the respective blade is circumferentially offset relative to the end portions to provide each fan blade with a chevron-like configuration and appearance between opposite ends of the fan in order to facilitate a substantially constant output flow of air across the expanse of the fan assembly.

BRIEF DESCRIPTION OF THE DRAWINGS

FIG. 8 illustrates an air flow pattern such as might occur when a deficient air flow is presented near the center of the transverse fan assembly according to the present invention.

DETAILED DESCRIPTION OF THE INVENTION

Figure 1:
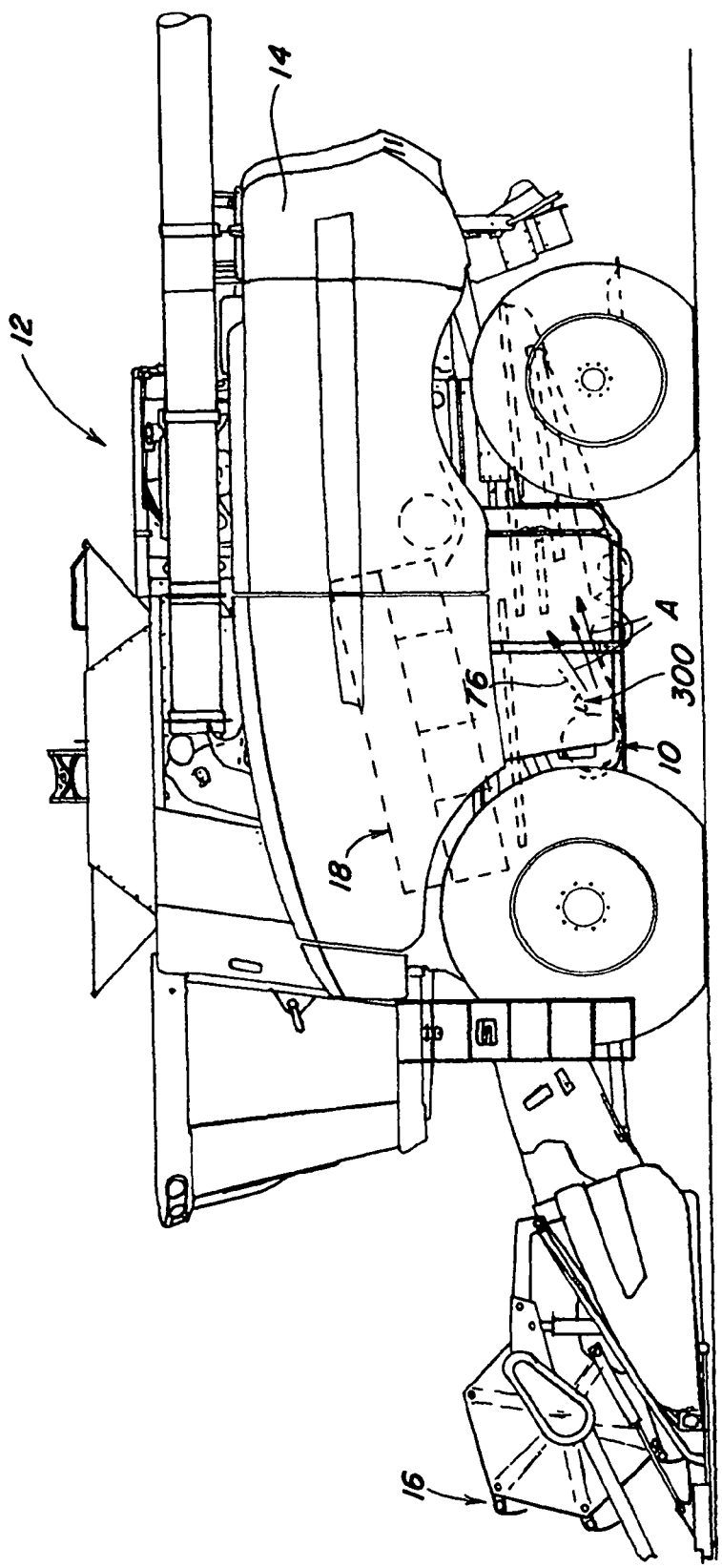
FIG. 1 a left side view of a typical combine harvester in which a transverse fan assembly according to the present invention is installed in conjunction with a cleaning system.
Figure 2:
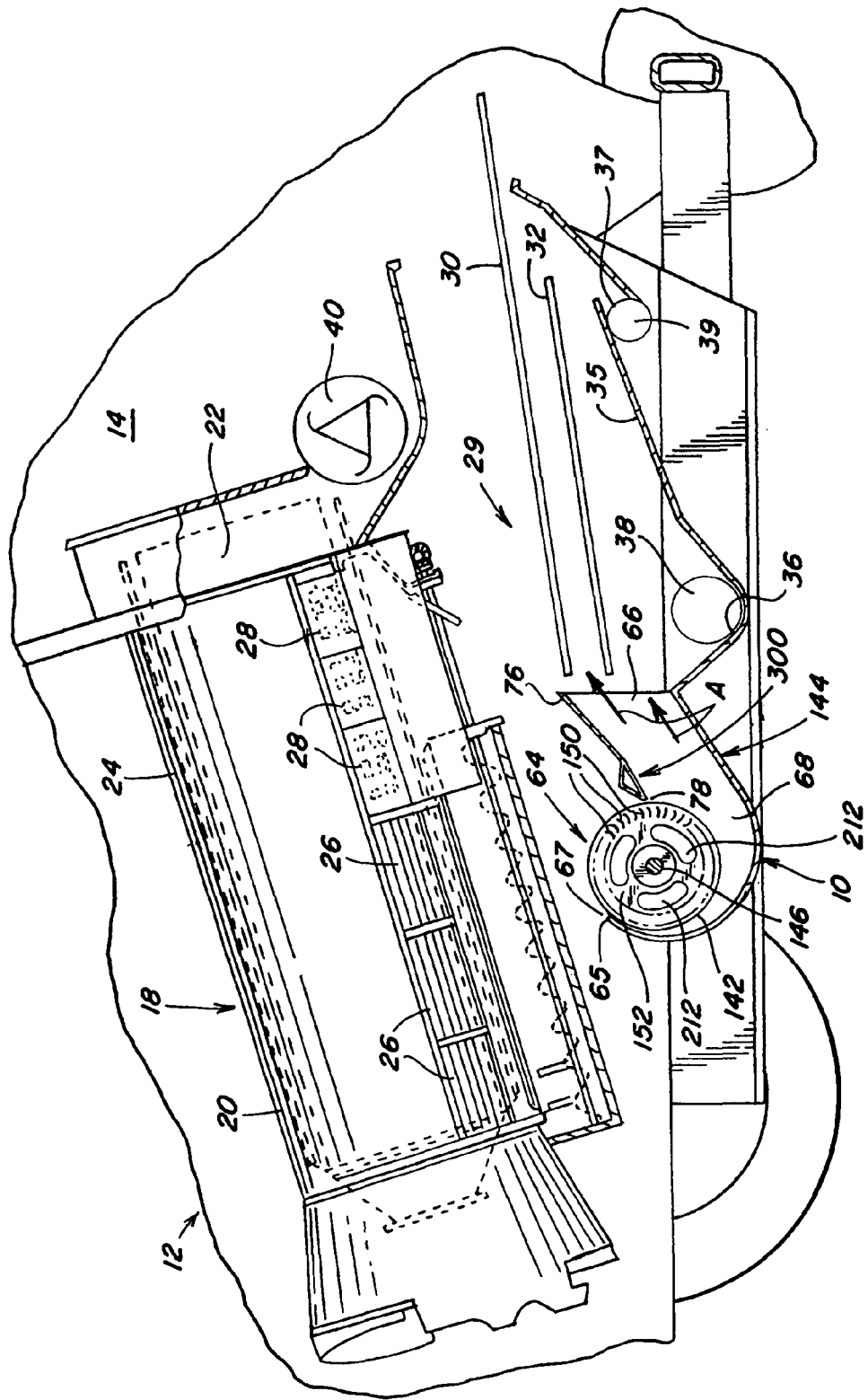
FIG. 2 is a partial cross-sectional view of a portion of the combine harvester of FIG. 1 showing the threshing apparatus and cleaning system of such combine harvester in conjunction with a preferred embodiment of a transverse fan assembly.

Referring now to the drawings, wherein preferred embodiments of a transverse fan assembly that includes the present invention are shown, wherein like numerals refer to like items, wherein certain elements and features may be labeled or marked on a representative basis without each like element or feature necessarily being individually shown, labeled, or marked, and wherein certain elements may be labeled and marked in only some, but not all, of the drawing figures, FIGS. 1 and 2 identify the general location of and depict one preferred embodiment of a transverse fan assembly 10 according to the present invention arranged in operable combination with a typical, conventional, self-propelled agricultural combine harvester 12 of the axial-flow type wherein crop material is threshed and separated while it is advanced by and along a generally longitudinally arranged rotor.

It should be appreciated that, while the following discussion will be directed principally to transverse fan assembly embodiments as employed in such a combine harvester, the transverse fan assemblies of the present invention are not limited to use in such harvesters, but could equally as well be employed or utilized in or with other harvesters and equipment, including harvesters that employ dual rotor threshing systems and with equipment for other applications, or with other equipment or in other circumstances and situations, consistent with the principles and teachings expounded.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be a point at the rear of the machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well known design, construction, and operation to those skilled in the art, the details of such components and their operations will not generally be discussed in significant detail unless considered of pertinence to the present invention or desirable for purposes of better understanding.

Against such backdrop, and with reference again to FIGS. 1 and 2, the self-propelled combine harvester 12 is operatively powered by an engine (not shown) suitably housed within a body 14 of the combine harvester to provide driving power. The transfer of rotation and power from the engine to various driven components of the combine is of a conventional nature and could include fixed or variable belt or chain drives which are not shown for purposes of clarity.

At its front end, combine harvester 12 is provided with a conventional crop harvesting header 16. The choice of header, of course, does not limit or relate to the present invention. The crop harvesting header 16 cuts and directs crop material into a conventional threshing apparatus 18.

As is well known in the art, and as is better illustrated in FIG. 2, the threshing apparatus includes a rotor assembly 20, including a relatively large diameter rotor 22 that is mounted within a threshing cage 24. Disposed about the cage 24 is a simple system of concaves 26 and separating grates 28 which, through the action of the rotor 22 and centrifugal force, act to separate grain material from other crop residue that is too large to pass through the concaves 26 and grates 28, sometimes hereafter referred to as straw.

The threshed grain material is delivered to a cleaning system 29 that includes a pair of vertically spaced apart cleaning sieves 30 and 32 while the straw is propelled rearwardly through the rotor assembly 20 where a conventional beater 40 acts upon the crop residue discharged from the rotor assembly 20. Beater 40 propels the crop residue from the rear of the rotor assembly 20 and throws it back for broad discharge from the rear end of the combine.

One example of such a combine harvester and its component systems is further described in U.S. Pat. No. 5,599,162, which is incorporated herein in its entirety by reference thereto. For purposes of consistency and ease of reference and discussion, insofar as is feasible, the same reference numerals are employed herein as were utilized in U.S. Pat. No. 5,599,162 to identify like or similar components and features.

As may be observed from FIG. 2, auger 34 moves the threshed grain material to the cleaning sieves 30 and 32, which sieves form part of the cleaning system 29 and are mounted for oscillation to separate grain from other larger pieces of threshed crop material. As the sieves 30 and 32 are vibrated or oscillated, the grain falls through the sieves 30 and 32 to an underlying clean grain pan 35 and into a clean grain trough or collector 36. An auger 38 directs the grain from the clean grain trough 36 into a hopper or grain bin (not shown) often housed generally directly behind the cab 12 (FIG. 1) within combine harvester body 14.

The threshed grain material that is too large to fall through the sieves 30 and 32 forms a relatively large crop mat or veil extending across substantially the entire sieve construction, as fan assembly 10 provides air that is blown upwardly and rearwardly, as denoted by arrows A, through sieves 30 and 32. Such air flow acts to blow lighter, non-grain elements, sometimes referred to as chaff, away from the crop mat remaining on the sieves 30 and 32 towards the rear of the harvester, where such chaff is handled in conventional and well-known manners.

The larger and heavier threshed crop material, sometimes referred to as tailings, that remains on the sieves 30 and 32 as they continue to vibrate or oscillate is caused to pass over the ends of the sieves 30 and 32 to fall to an underlying tailings pan and into a tailings trough or collector 37. An auger 39 directs the tailings from the tailings trough to a tailings return conveyor system (not shown) that is operable to carry the tailings upwardly, back to the cleaning or separating systems of the combine harvester 12, for reprocessing, which may include further threshing of such tailings.

FIGS. 2-6 depict a fan assembly 10, constructed in accordance with the present invention, and various components thereof, in greater detail, and FIG. 2 also depicts such fan assembly 10 in combination with the cleaning sieves 30, 32, towards which sieves the air outflow from fan assembly 10 is directed. In the particular embodiment illustrated, the fan assembly 10 comprises an elongated transverse or cross-flow fan 142 within an air plenum 144, with fan 142 extending generally transversely across a great extent, preferably substantially the entire width, of the combine harvester 12. More specifically, as shown in FIG. 2, fan 142 is generally transversely mounted on the combine harvester 12 beneath the threshing apparatus 18 and preferably forward of the cleaning sieves 30, 32.

As shown in FIGS. 2-6, fan 142, sometimes referred to as a fan rotor, includes a central and preferably elongated hub or axle 146 defining an elongated axis of a rotation 148 for the fan, a plurality of closely spaced fan blades 150 generally extending adjacent to and along axle 146 or wrapping therearound, and projecting outwardly in a circumferential array or pattern about the axis of rotation 148, to define an open center for the fan 142, and a plurality of axially spaced and aligned fan blade mounting disks 152 to which the fan blades 150 are mounted.

The fan blades 150 preferably are arranged in closely spaced relation relative to each other, with each fan blade 150 preferably having a forwardly curved cross-sectional configuration. In the generally preferred forms of the fan 142, each fan blade 150 is formed from a material such as sheet metal and is connected to the fan blade mounting disks 152.

Each fan blade mounting disk 152 is connected to and extends generally radially outward from the axle 146 for driving the fan blades 150 mounted thereto. Such mounting disks 152 are preferably of substantially uniform diameter and, while shown in the noted figures as having a generally round geometric configuration, could take any suitable shape, such as, for example, spoke-shaped, star-shaped, and the like. At least a pair of fan blade mounting disks 152 are arranged toward opposite ends of the fan 142, but, since the length of the transverse fan 142 is functionally unlimited, additional disks 152 may be provided along the expanse of the fan 142 to counteract centrifugal forces acting on the blades 150 during operation of the fan assembly 10.

Figure 3:
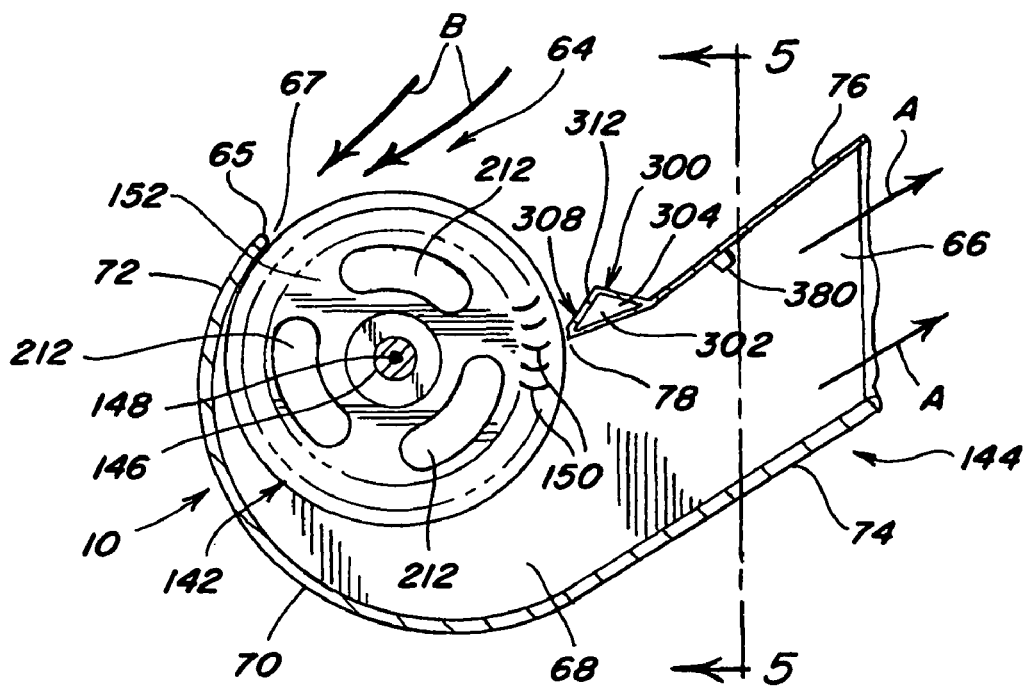
FIG. 3 is an enlarged cross-sectional view of the transverse fan assembly of FIG. 2.
Figure 4:
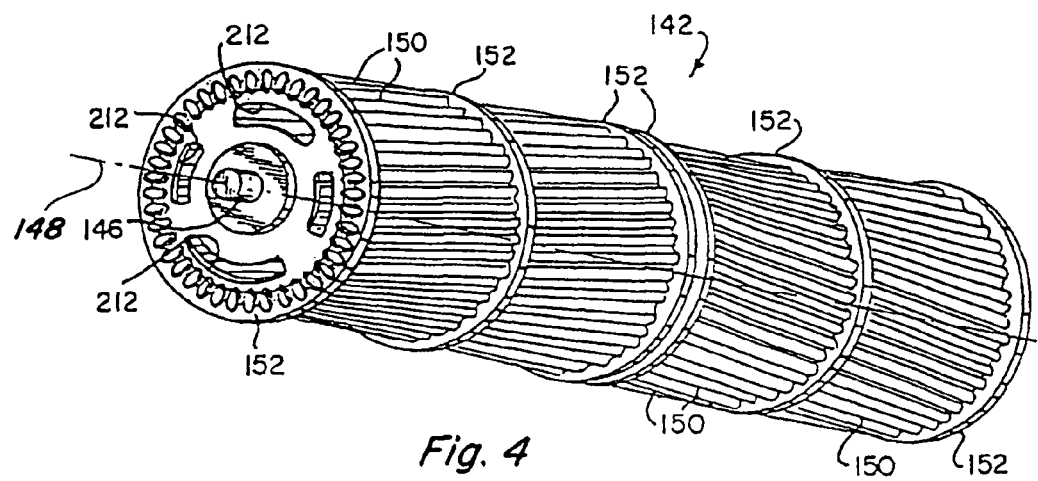
FIG. 4 is a perspective view, from the left rear, of a typical, preferred form of a fan rotor assembly of the transverse fan assembly.
Figure 5:
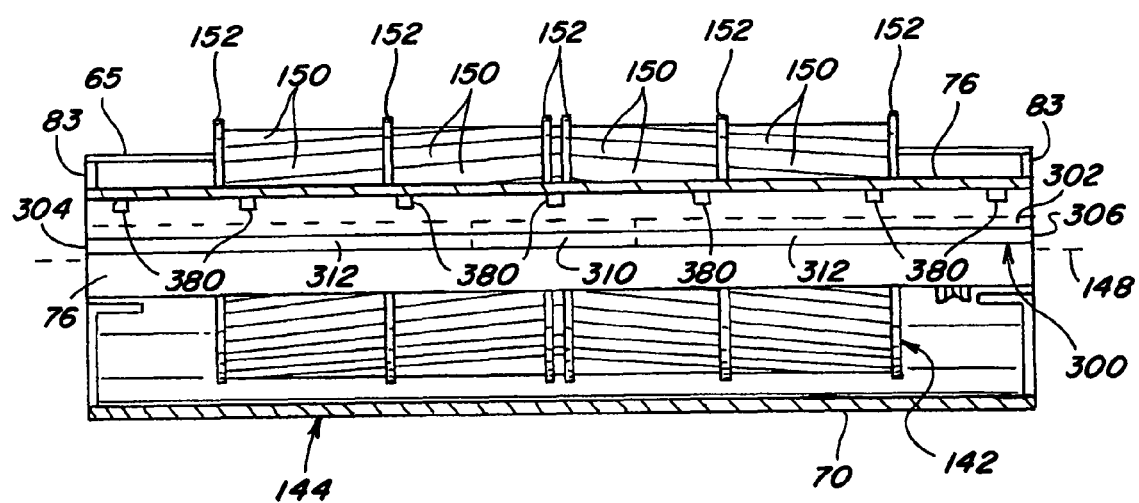
FIG. 5 is a cross-sectional view taken along line 5-5 of FIG. 3, looking forward, showing the transverse fan assembly and the position of the supplementary air feed inlet relative to other portions of the transverse fan assembly.

Referring now to FIGS. 4 and 5, it is preferred, including for the purpose of reducing fan noise, that the opposite ends of the fan blades 150 be arranged in general axial alignment relative to each other, but that the center portion of each fan blade 150 be offset in circumferential relation relative to the opposite end thereof such that the fan blade 150 slants or tapers toward a peripheral center portion of the fan whereby each fan blade 150 has a chevron-like configuration between opposite ends thereof. The chevron "points" in the direction of forward fan rotation when the fan is operating, shown as arrows B in FIG. 3. The resultant flow of air off the blades 150 is directed somewhat outwardly toward the fan ends in a manner improving fan performance by lessening end air effects. Slanting of the fan blades 150 furthermore has proven to reduce operating noise (sound) levels of the fan 142.

Accordingly, higher fan speeds can be used to increase the output flow of air from the fan 142 without concern over increasing environmental noise pollution or noise levels can be reduced when the fan speed remains unchanged. The degree of slanting, or angle, of the fan blades 150 that may be used for noise reduction is not without limits, however. As the blade angle is increased from zero with respect to the axis of rotation 148, zero angle being an axially straight blade, air flow outwardly from the fan is initially increased, air flow uniformity is improved, and noise is reduced. However, as the fan blade angle is increased further, air flow in the axial direction of the fan increases, lessening the air flowing tangentially from the fan blades which tends to negatively affect air flow rate and uniformity, and to increase noise.

Although, as noted, in the most preferred form of the fan the fan blades are disposed in a chevron-like configuration, fans in which fan blades are arranged differently, including in a cylindrical pattern wherein the blades are in substantially parallel axial alignment with the axis of rotation 148, that is, where there is no angling of the fan blades, may also be employed in fan assemblies according to the present invention.

As better shown in FIGS. 2, 3, and 5, air plenum 144 extends generally cross-wise across the combine harvester 12 along substantially and often somewhat beyond the entire expanse of the fan 142 and generally longitudinally within the combine harvester 12. Such air plenum 144 is preferably fabricated from an air impervious material with an air inlet 64 (FIG. 3), sometimes hereinafter referred to as air inlet opening 64, an air outlet 66, sometimes hereinafter referred to as air outlet opening 66, and an internal chamber 68 in which fan 142 is mounted.

In the embodiment depicted, such air plenum 144, when viewed from the left side, has a cross-sectional scroll-like configuration, as best shown in FIGS. 2 and 3, with a continuous lower wall 70 that has an upstream curvilinear face 72 and a downstream curvilinear face 74, an upper air directing baffle construction, such as baffle 76, and side walls 83, which side walls are better shown in FIG. 5.

Lower wall 70 wraps about the forward portion of fan 142, from air inlet opening 64 at the leading edge 65 of such lower wall 70, and extends generally rearwardly to air outlet opening 66. The upstream curvilinear face 72 of lower wall 70 is disposed closely adjacent the outer periphery of fan 142 to form an air inlet entryway 67 at and adjacent to the leading edge 65, and the downstream curvilinear face 74 extends rearwardly and upwardly, at an increasing distance from the fan 142, toward the sieves 30, 32 for directing air drawn into the fan 142 from air inlet 64 through air inlet entryway 67 rearwardly through internal chamber 68 towards air outlet opening 66 for discharge therethrough.

Baffle 76, which generally extends from a proximate portion near the rearmost outer periphery of transverse fan 142 to a distal portion at air outlet 66, serves to separate air inlet 64 from air outlet 66 and to direct the air flow from transverse fan 142 towards air outlet 66. To avoid undesirable disruptions and turbulence in such air flow, the interior surface of baffle 76 is preferably generally smooth and devoid of projections and recesses that might interrupt the air flow therealong or result in the generation of undesirable vortices or other anomalies or disruptions in such air flow.

With fan 142 positioned within internal chamber 68 of air plenum 144 extending generally transversely to the forward direction of travel of combine harvester 12, axle 146 of fan 142 is supported at the opposite ends of fan 142, as in FIG. 5, such as, by way of example and not of limitation, by being rotatably mounted in bearing blocks (not shown) secured at opposite sides of the air plenum 144, although various other constructions could be equally as well utilized to provide such support, and constructions and systems of known design and operation can be readily employed to effect rotation of the fan 142 about its axis of rotation 148.

With such a construction, as fan 142 is rotated forwardly air will thus be drawn into and through air inlet entryway 67, as illustrated by arrows B (FIG. 3), in an air flow pathway from air inlet 64, which air inlet 64 typically extends across the top side of the fan 142 and is bounded rearwardly by baffle 76. The air so drawn into air plenum by the rotation of fan 142 will be forcibly discharged through air outlet 66, as shown by arrows A.

As has been previously noted, although it is desirable that the volume of air and the air flow pattern being introduced into air inlet entryway 67 be such that the resultant output air flow pattern across the expanse of air outlet opening 66 will be uniform and consistent, such is often not the case, as a consequence of which it has been found desirable to be able to introduce and supply additional or supplemental air into the air inlet 64 in such a way that voids or deficiencies in the air flow along the air pathway through air inlet 64 to air inlet entryway 67 can be compensated for.

Figure 6:
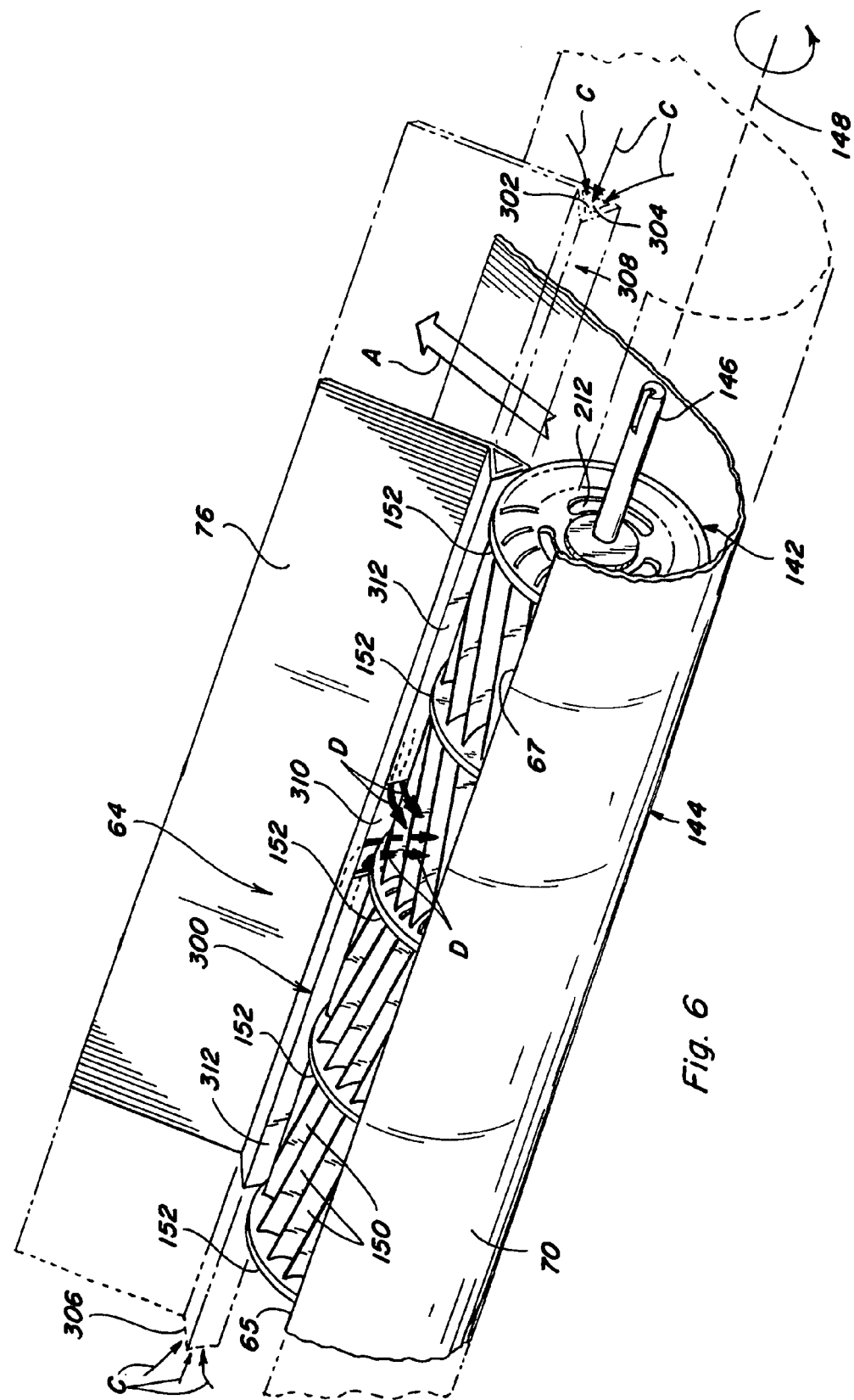
FIG. 6 is a partial perspective view, partly in cut-away, taken from the left front, of the transverse fan assembly, further illustrating the position of the supplementary air feed inlet relative to other portions of the transverse fan assembly, with the outer side portions of the supplementary air feed inlet shown in phantom.

With particular reference to FIGS. 2, 3, 5, and 6, supplementary air feed inlet 300 is provided along baffle 76 proximate the outer periphery of fan 142, such as at or near the generally rearmost periphery 78 thereof, and, in one preferred embodiment, supplementary air feed inlet 300 forms an air channel or chamber 302 that extends generally transversely across the width of air plenum 144, generally adjacent to air inlet 64 and parallel to air inlet entryway 67, and has open opposite ends 304 and 306. As best shown in FIG. 6, a central portion of chamber 302 is open along a side 308 thereof to form an aperture 310 such that chamber 302 is in communication with air inlet 64 at such central portion. Separation members 312, which may be formed to be separable members from baffle 76 or which may be formed or configured to be non-separable portions of a larger construction, including portions of a unitary construction, are disposed to either side of aperture 310 along side 308 to separate chamber 302 from air inlet 64 along the expanses of such separation members 312.

As is better shown in FIG. 3, as fan 142 is rotated forwardly, air is drawn from and through air inlet opening 64 towards and through air inlet entryway 67. In addition, as is better shown in FIG. 6, supplementary air is drawn through the open ends 304 and 306 of air chamber 302, as depicted by arrows C, and therethrough to and through aperture 310 along side 308 of chamber 302, as depicted by arrows D, to the central portion of air inlet 64, from whence it is drawn into the central portion of air inlet entryway 67.

Figure 7:
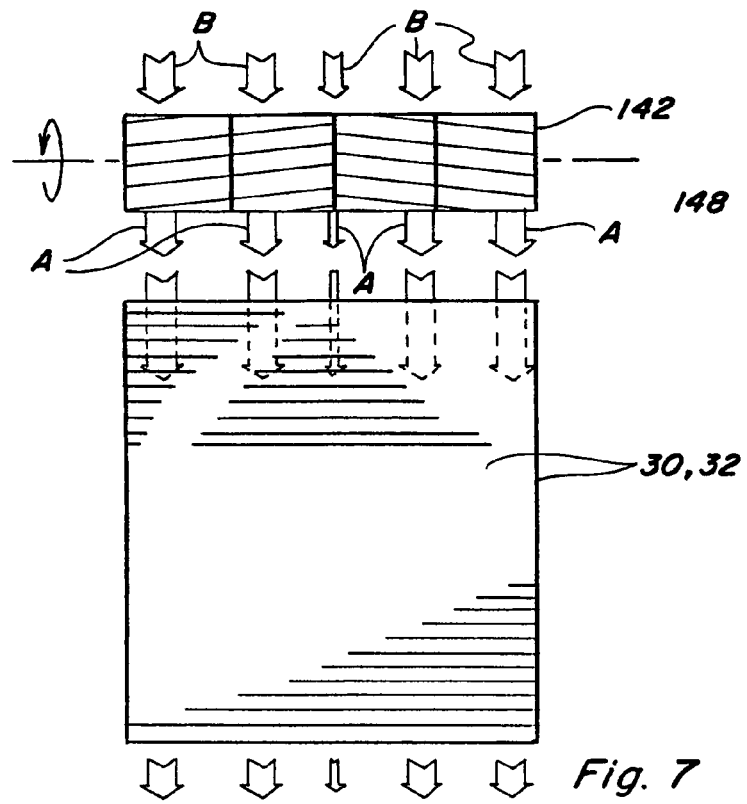
FIGS. 7 and 8 are generalized and simplified top plan views of transverse fan assemblies, in which views, for purposes of clarity, the air plenum is not shown, illustrating in a simplified manner how the use of the present invention results in a more uniform output air flow from the transverse fan assembly when a deficient air flow is presented near the center of the transverse fan assembly, with FIG. 7 illustrating an air flow pattern such as might occur when a deficient air flow is presented near the center of the transverse fan assembly without the use of the present invention
Figure 8:
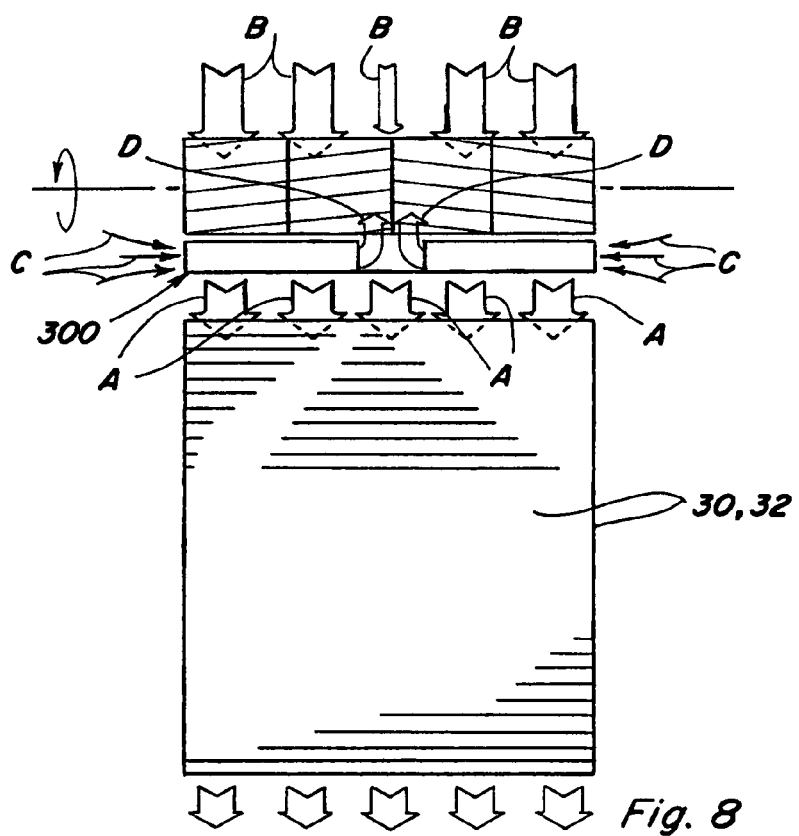

The supplementary air that is so provided through supplementary air feed inlet 300 to air inlet 64 and to air inlet entryway 67 of fan assembly 10 results in a more uniform output air flow pattern across the expanse of air outlet 66 as fan 142 rotates forwardly, as is illustrated by FIGS. 7 and 8, in which, for purposes of clarity and description, the air plenum is not shown. In such regard, with particular reference to input air flow to the fan 142, as represented by arrows B, and output air flow to sieves 30, 32, as represented by arrows A, FIG. 7 depicts a typical air flow pattern to sieves 30, 32 such as might ensue when air flow to the central portion of fan 142 is deficient and no supplementary air feed inlet 300 is provided, while FIG. 8 depicts an improved air flow pattern that results when supplementary air feed inlet 300 is provided and utilized.

Figure 9:
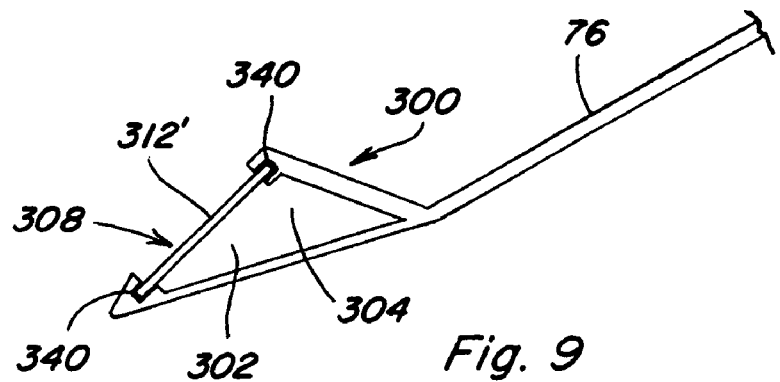
FIG. 9 is a side view of one configuration of a supplementary air feed inlet that includes features permitting the separation members to be repositionable to define the extent of communication and separation of the elongated chamber of the supplementary air feed inlet with the air inlet of the transverse fan assembly.

Although the separation members 312, as shown in FIG. 6, may be formed or configured to essentially be fixed in a permanent position, the supplementary air feed inlet may also be so formed and constructed that variable and repositionable separation members may be employed in order to permit some customization of supplementary air introduction into the fan to better address air flow deficiencies into the fan that would otherwise exist. In such regard, supplementary air feed inlet 300 may be formed, as shown in FIG. 9, to include, along side 308 of chamber 302, slide channels 340 that hold removable and/or repositionable separation members, such as separation members 312', which are better shown in FIG. 10. The removable separation members 312' may be slidably positioned within the slide channels 340 and slidably further inserted or withdrawn to vary the size of the central opening or aperture 310 (FIG. 6) between elongated chamber 302 of supplementary air feed inlet 300 and the air inlet 64.

Figure 10:
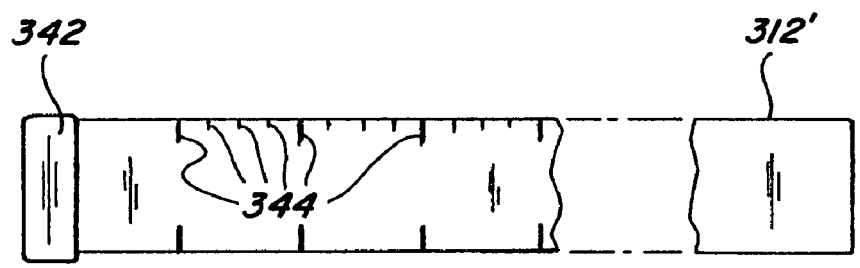
FIG. 10 is a plan view of a separation member that may be employed with the supplementary air feed inlet construction of FIG. 9.

As shown in FIG. 10, the separation members 312' may optionally be provided with end pull portions 342 designed to be grasped by a user as the separation members are being positioned and may also have gradations 344 along their lengths to assist a user in determining the degree or amount of insertion of the separation member 312' and the consequent size of the central aperture 310 along side 308 of the elongated chamber 302. By employing two like separation members 312' insertable from opposite ends of the supplementary air feed inlet 300, the size of the central aperture 310 along side 308 of chamber 302 may be varied to obtain greater or lesser air flow into the central portion of air inlet 64 so as to effect a more uniform air flow pattern across the expanse of air outlet 66.

Figure 11:
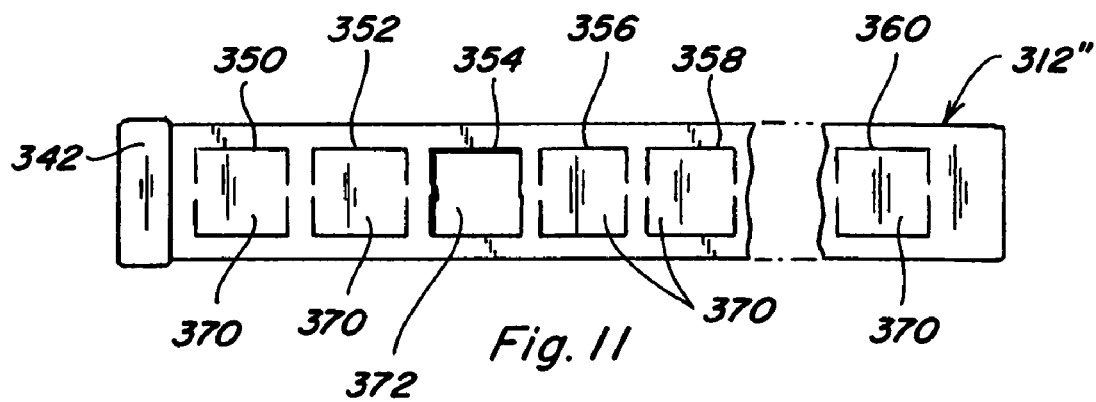
FIG. 11 is a plan view of another embodiment of a separation member that may be employed with the supplementary air feed inlet construction of FIG. 9, which separation member has a plurality of element locations at spaced intervals along its length, each of which element locations may optionally either be closed by a shield or opened by removal of the shield to provide, respectively, either a separation or communication, via an aperture, between the elongated chamber and the air inlet of the transverse fan assembly at the point of such element location when the separation member is disposed between the elongated chamber and the air inlet of the transverse fan assembly.

In some instances, air flow deficiencies may also exist in air flow into the fan 142 at locations other than the central portion of the fan expanse, such as due to obstructions in the air flow pathway into and through air inlet 64 to air inlet entryway 67. FIG. 11 depicts an alternative separation member 312" that is similar in many respects to separation member 312', but which includes along its length a plurality of element locations 350, 352, 354, 356, 358, and 360 configurable to provide openings through the separation member 312" at user selectable locations to permit the introduction of air from the supplementary air feed inlet 300 at different selectable locations across the expanse of the fan 142. As shown in FIG. 11, element shields 370 remain in place at element locations 350, 352, 356, 358, and 360, but the element shield at element location 354 has been removed to provide an opening 372 through separation member 312" at such location. By selectively removing or allowing shields 370 to remain in place, a user can thus determine the locations across the expanse of the fan 142 at which supplementary air is introduced, and can configure the separation member 312" to effect the desired air flow from the air outlet 66.

It will be appreciated by those skilled in the art that the shields 370 may be so formed along the lengths of separation members 312" that they can be conveniently punched out by a user as needs dictate, but various other constructions usable for like effect could also be advantageously employed, such as individually installable and removable shield constructions or slide closures, to mention but a few of numerous possibilities.

Optionally, to assist in determining whether an acceptably uniform air flow pattern is being produced from fan 142 and across the expanse of air outlet 66, air flow sensors or monitors 380 may be installed at desired locations within air plenum 144, for example, as depicted in FIGS. 3 and 5, or at air outlet 66 or even beyond such outlet. By monitoring the volume of air flow at a plurality of locations across the expanse of the fan and downstream therefrom, a user can determine whether adjustments in the provision of supplementary air to air inlet 64 may be desirable and how the introduction of supplementary air at various locations along the expanse of the fan 142 affects the uniformity of air flow across the expanse of air outlet 66. By adjusting the size and/or locations of apertures through side 308 of elongated chamber 302, the amount and introduction location of supplementary air can thus be varied to obtain a desired air flow pattern across the expanse of air outlet 66.

To this point in these discussions, the supplementary air feed inlet has been addressed primarily with respect to the particular embodiment depicted in FIG. 3, wherein the elongated chamber 302 is disposed to extend generally transversely across air plenum 144 adjacent to the outer periphery of fan 142 at or near the proximate or forward end of baffle 76, with such elongated chamber 302 having a somewhat triangular cross-sectional shape. It should be understood and appreciated that such a construction is but one of many possible embodiments of acceptable supplementary air feed inlets and that numerous variations thereof are possible within the spirit and scope of the present invention.

Figure 12:
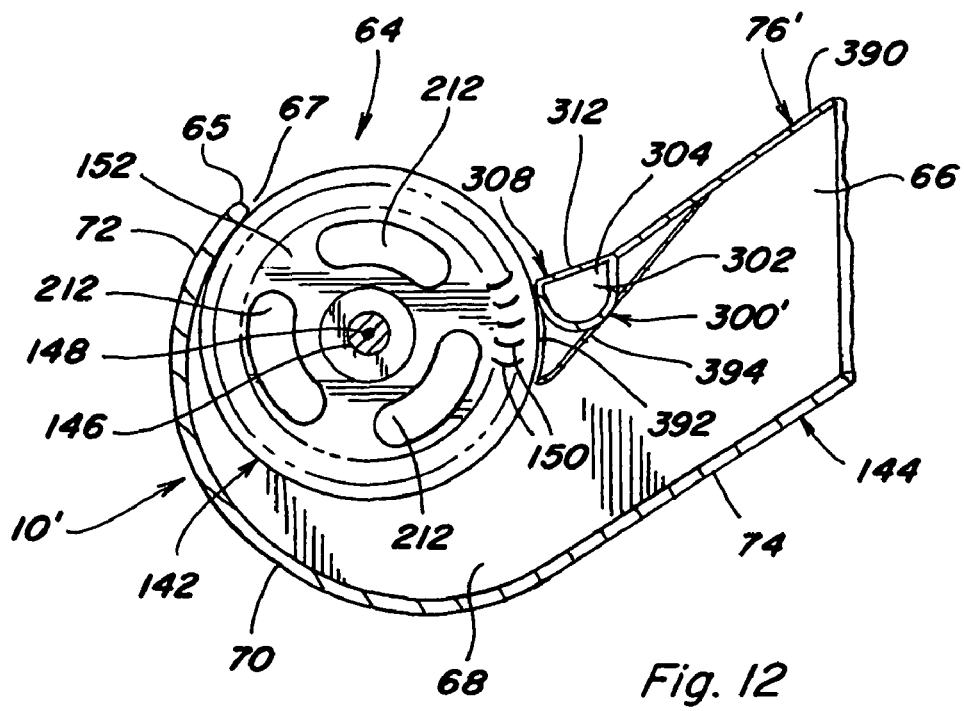
FIG. 12 is a cross-sectional view, similar to FIG. 3, but showing an alternative embodiment of the transverse fan assembly that employs a supplementary air feed inlet that has a different cross-sectional configuration and is positioned slightly differently.

In such regard, by way of illustration only and not of limitation, FIG. 12 depicts an alternative embodiment 10' of a transverse fan assembly that employs a supplementary air feed inlet 300' that is positioned slightly differently than that of FIG. 3 and has a different cross-sectional configuration. The baffle construction 76' includes a baffle wall 390 that extends from air outlet 66 forwardly to the supplementary air feed inlet 300' that is disposed adjacent the outer periphery of fan 142 at the rear thereof. In such embodiment supplementary air feed inlet 300' has a more gutter-shaped cross-section. To maintain a relatively clear passageway from fan 142 to air outlet 66, baffle construction 76' also includes a forward wall 392 and channeling wall 394, the purpose of which is to try to eliminate or minimize the introduction or occurrence of projections into, or recesses along, the flow passageway from the fan 142 to air outlet 66, which features could interfere with a smooth air flow and disrupt uniformity of the air flow.

Figure 13:
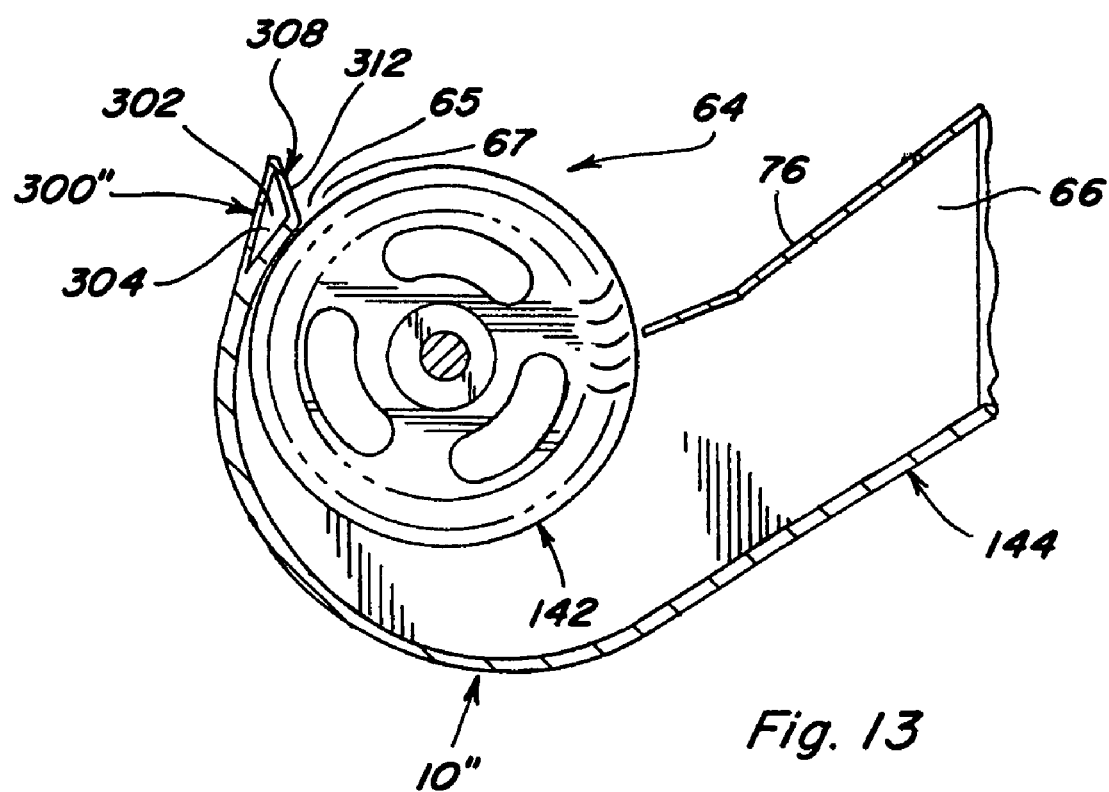
FIG. 13 is a cross-sectional view similar to FIGS. 3 and 12, but showing a further alternative embodiment of the transverse fan assembly that employs a supplementary air feed inlet disposed along the leading edge of the lower wall of the air plenum instead of along the baffle separating the air inlet and the air outlet.

Although both of supplementary air feed inlets 300 and 300' have been shown disposed generally at or near the forward or leading ends of baffle constructions 76 and 76', the placement or positioning of supplementary air feed inlets should not be considered to be restricted to such location. Again, by way of illustration only and not of limitation, FIG. 13 depicts a further embodiment 10" of a transverse fan assembly that employs a supplementary air feed inlet 300" that is instead positioned generally adjacent to the leading edge 65 of lower wall 70 of air plenum 144. Supplementary air feed inlet 300" is otherwise similar in many respects to supplementary air feed inlet 300, but its position permits the introduction of supplemental air into air inlet 64 nearer to air inlet entryway 67.

Although the foregoing discussion has principally addressed the use of the invention for the infill of air into the air inlet, generally near the center of the expanse of the air inlet and the transverse fan to effect a more uniform air flow pattern across the expanse of the air outlet, it should be appreciated that there could arise instances where a different air flow pattern might be desired by a user. Especially by employing separation members such as separation members 312" of FIG. 11, supplementary air can be introduced into the air inlet at such singular or multiple locations across the expanse of the air inlet as will produce the desired air flow pattern. In such event, the air sensors or monitors 380 as discussed hereinabove can provide valuable feedback to a user as to the effectiveness of such configuration in achieving the desired air flow pattern, from which feedback the user can determine whether further changes in the provision of the supplementary air may be advisable.

In addition, although, in the embodiments discussed hereinabove, the expanses of the air plenum, the air inlet, the air inlet entryway, the transverse fan, and the air outlet have all been approximately the same, such is not necessarily required and certain of the expanses may be broader or narrower than others. For example, the expanse of the air outlet could be narrower than the expanse of the transverse fan, but the principals of operation of the subject invention will still generally apply and a desired output air flow pattern from the air outlet can still be realized by the use of a supplementary air feed inlet to supply supplementary air into the air inlet at appropriate locations across the expanse thereof.

In light of all the foregoing, it should thus be apparent to those skilled in the art that there has been shown and described a transverse fan assembly, including for use with agricultural combine harvesters, which fan assembly has a supplementary air feed inlet therewith for the infill of air flow voids or deficiencies in the air flow pathway so as to effect a desired, generally more uniform, output air flow pattern across the entire expanse of the transverse fan and/or air outlet, and a method of use thereof. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention.

Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A transverse fan assembly for effecting, in the air flow output across the expanse of the air outlet therefrom, a desired air flow pattern, comprising
    an air plenum having associated therewith an air inlet thereto and an air outlet therefrom,
    said air inlet having an expanse across which air is provided to be drawn into the transverse fan assembly,
    said air outlet having an expanse across which air is expelled from the transverse fan assembly,
    a transverse fan disposed within said air plenum,
    said transverse fan having an expanse extending generally across said air plenum, being rotatable about an axis of rotation extending generally across said air plenum, and having an outer periphery,
    said air plenum having a leading edge disposed generally adjacent to said outer periphery of said transverse fan,
    said leading edge and said transverse fan defining an air inlet entryway from said air inlet to said air plenum,
    said air inlet entryway having an expanse extending generally along at least a portion of said outer periphery of said transverse fan,
    said transverse fan rotatable about said axis of rotation to draw air in an air pathway from said air inlet into and through said air inlet entryway across the expanse thereof as said transverse fan rotates and to effect a resultant air flow pattern of air from said air outlet across the expanse thereof,
    said resultant air flow pattern from said air outlet across the expanse thereof being dependent, in part, upon the pattern of air flow from said air inlet into said air inlet entryway across the expanse thereof,
    a supplementary air feed inlet including an air chamber open at least one location to a source of supplemental air and having an aperture at least one other location along said air chamber open to said air inlet of said air plenum at a given location along the expanse thereof,
    rotation of said transverse fan about said axis of rotation thereby drawing air from said source of supplemental air into and through said air chamber to said aperture in said air chamber and therethrough for introduction into said air inlet and said air pathway therethrough at the location of said aperture,
    said introduction of said supplemental air into said air inlet and said air pathway therethrough at the location of said aperture producing an increased volume of air flow into said air inlet entryway near said location of said aperture across the expanse thereof,
    said increased volume of air flow into said air inlet entryway near said location of said aperture across the expanse thereof effecting a resultant air flow pattern across the expanse of the air outlet that differs from the resultant air flow pattern that would otherwise be realized across the expanse of the air outlet in the absence of said increased volume of air flow in the air pathway in said air inlet,
    wherein said supplementary air feed inlet includes an elongated chamber extending generally across said air plenum adjacent said air inlet, wherein said elongated chamber of said supplementary air feed inlet includes opposed ends open to supplemental air, wherein said elongated chamber includes a first side extending generally adjacent to said air inlet, said first side including first and second separation members extending inwardly towards one another from said opposed open ends and an opening between said first and second members along said first side, said opening permitting the passage of air therethrough from said elongated chamber to said air inlet,
    whereby a desired air flow pattern across the expanse of the air outlet is realizable by providing supplementary air from said supplementary air feed inlet to said air inlet to effect an infill of air flow into the air flow pathway to said transverse fan near said aperture along said air chamber of said supplementary air feed inlet.

2. The transverse fan assembly of claim 1, wherein, said first side having at least one aperture therethrough along its length constituting said aperture in said elongated chamber through which aperture air within said elongated chamber may pass into said air inlet.

3. The transverse fan assembly of claim 2 wherein said aperture is disposed generally centrally along said first side of said elongated air chamber.

4. The transverse fan assembly of claim 1 wherein said separation members are removably installable along said first side.

5. The transverse fan assembly of claim claim 1 wherein said first side includes slide channels therealong and said separation members are slidably positionable within said slide channels.

6. The transverse fan assembly of claim 5 wherein said separation members are slidable within said slide channels to vary the size of the opening therebetween.

7. The transverse fan assembly of claim 1, wherein,
    said separation members have a plurality of spaced element locations therealong,
    said spaced element locations include shield portions thereat, and
    said shield portions are selectably removable to define apertures through said separation members at said element locations through which apertures air may pass from said elongated chamber to said air inlet.

8. The transverse fan assembly of claim 7 wherein said rotation of said transverse fan effects an air flow pattern therefrom within said air plenum and said air plenum includes a plurality of air flow monitors disposed to monitor said air flow pattern from said transverse fan.

9. The transverse fan assembly of claim 7 including a plurality of air flow monitors disposed to monitor said air flow pattern from said air outlet across the expanse thereof.

10. The transverse fan assembly of claim claim 1 including a baffle construction separating said air inlet from said air outlet, said baffle construction extending across said air plenum between a proximate end near the rear outer periphery of said transverse fan and a distal end at said air outlet, said supplementary air feed inlet extending generally across said air plenum near said proximate end of said baffle construction.

11. The transverse fan assembly of claim 10 wherein said elongated chamber of said supplementary air feed inlet has a generally triangular cross section.

12. The transverse fan assembly of claim 10 wherein said supplementary air feed inlet and baffle construction are so formed and constructed to provide a generally interior surface across said air plenum from adjacent to the rear outer periphery of said transverse fan to said air outlet that is generally smooth and devoid of substantial projections and recesses therealong that would interfere with the smooth flow of air through said air plenum.

13. The transverse fan assembly of claim 1, wherein said air plenum includes a lower wall that extends across said air plenum and that wraps around said transverse fan from said leading edge of said air plenum to said air outlet,
    said first side has at least one aperture therethrough along the its length constituting said aperture in said air chamber through which air within said elongated chamber may pass into said air inlet, and
    said first side of said elongated chamber of said supplementary air feed inlet adjoins said leading edge,
    said spaced element locations include shield portions thereat, and
    said shield portions are selectably removable to define apertures through said separation members at said element locations through which apertures air may pass from said elongated chamber to said air inlet.

14. The transverse fan assembly of claim 1 wherein said transverse fan has opposed outer end portions and a center portion across an expanse thereof and includes a plurality of elongated fan blade members extending in an axial cylindrical pattern about said axis of rotation,
    said fan blades have end and center portions corresponding generally to said outer end portions and center portion of said transverse fan,
    said center portions of said fan blades are angularly offset from respective end portions of said fan blades to provide each fan blade with a chevron-like configuration between said opposed end portions,
    rotation of said transverse fan effects an air flow from nearer the center portion of said expanse of said transverse fan towards the outer end portions thereof, and
    said aperture along said air chamber of said supplementary air feed inlet is disposed to introduce supplemental air into said air inlet into an air pathway flowing generally towards said center portion of said transverse fan such that a greater volume of air is drawn into said transverse fan nearer the center portion thereof than the opposed end portions thereof, whereby rotation of said transverse fan effects an air flow pattern from said air outlet that is generally uniform across the expanse of said air outlet.

15. The transverse fan assembly of claim 14 wherein said fan blades project generally outwardly around said axis of rotation towards said outer periphery of said transverse fan and have a generally curved cross sectional shape.

16. The transverse fan assembly of claim 1 wherein said transverse fan includes a plurality of elongated fan blade members extending generally longitudinally axially about said axis of rotation, and rotation of said transverse fan effects air flow through said transverse fan in a generally straight pathway such that air entering said transverse fan at a given location across the expanse of said transverse fan on the upstream side of said transverse fan exits said transverse fan at approximately the same given location across the expanse of said transverse fan on the downstream side of said transverse fan,
    whereby introduction of supplemental air from said supplemental air feed inlet into said air inlet at a particular location across the expanse thereof effects an increased air flow into said transverse fan at the upstream side thereof near said particular location across the expanse thereof and a consequent air flow pattern with an increased air flow at the downstream side of said transverse fan at approximately the same given location across the expanse of said transverse fan.

17. A method of providing a desired air flow pattern across the expanse of an air outlet of a transverse fan assembly, comprising
    providing a transverse fan assembly including
    an air plenum having associated therewith an air inlet thereto and an air outlet therefrom,
    said air inlet having an expanse across which air is provided to be drawn into the transverse fan assembly,
    said air outlet having an expanse across which air is expelled from the transverse fan assembly,
    a transverse fan disposed within said air plenum,
    said transverse fan having an expanse extending generally across said air plenum, being rotatable about an axis of rotation extending generally across said air plenum, and having an outer periphery,
    said air plenum having a leading edge disposed generally adjacent to said outer periphery of said transverse fan,
    said leading edge and said transverse fan defining an air inlet entryway from said air inlet to said air plenum,
    said air inlet entryway having an expanse extending generally along at least a portion of said outer periphery of said transverse fan,
    said transverse fan rotatable about said axis of rotation to draw air in an air pathway from said air inlet into and through said air inlet entryway across the expanse thereof as said transverse fan rotates and to effect a resultant air flow pattern of air from said air outlet across the expanse thereof,
    said resultant air flow pattern from said air outlet across the expanse thereof being dependent, in part, upon the pattern of air flow from said air inlet into said air inlet entryway across the expanse thereof,
    a supplementary air feed inlet including an air chamber open at least one location to a source of supplemental air and having an aperture at least one other location along said air chamber open to said air inlet of said air plenum at a given location along the expanse thereof, wherein said supplementary air feed inlet includes an elongated chamber extending generally across said air plenum adjacent said air inlet, wherein said elongated chamber of said supplementary air feed inlet includes opposed ends open to supplemental air, said elongated chamber includes a first side extending generally adjacent to said air inlet, said first side includes at least one separation member having a plurality of spaced element locations therealong, said spaced element locations include shield portions thereat, and said shield portions are selectably removable to define apertures through said separation member at said element locations through which apertures air may pass from said elongated chamber to said air inlet,
    rotation of said transverse fan about said axis of rotation thereby drawing air from said source of supplemental air into and through said air chamber to said aperture in said air chamber and therethrough for introduction into said air inlet and said air pathway therethrough at the location of said aperture, said introduction of said supplemental air into said air inlet and said air pathway therethrough at the location of said aperture producing an increased volume of air flow into said air inlet entryway near said location of said aperture across the expanse thereof, said increased volume of air flow into said air inlet entryway near said location of said, aperture across the expanse thereof effecting a resultant air flow pattern across the expanse of the air outlet that differs from the resultant air flow pattern that would otherwise be realized across the expanse of the air outlet in the absence of said increased volume of air flow in the air pathway in said air inlet, rotating said transverse fan to draw supplementary air into and through said air chamber of said supplementary air feed inlet and through said aperture along said air chamber into said air inlet to introduce said supplementary air into the air pathway near the location of said aperture, to draw air from said air inlet into said transverse fan across the expanse of said air inlet entryway, to forcibly drive air from said transverse fan towards said air outlet to be expelled therefrom in the desired air flow pattern across the expanse of said air outlet, whereby the supplementary air introduced into said air inlet near the location of said aperture in said air chamber of said supplementary air feed inlet compensates for a deficiency in the air flow otherwise available at such location and necessary for the realization of the desired air flow pattern across the expanse of said air outlet.

18. The method of claim 17 wherein said first side of said elongated chamber is configurable by a user to establish therethrough those apertures as required to effect the desired air flow pattern across the expanse of said air outlet and wherein said step of providing said transverse fan assembly includes the step of configuring said first side of said elongated chamber to establish therethrough such required apertures for infill of supplementary air from said supplementary air feed inlet into said air inlet to effect the desired air flow pattern across the expanse of said air outlet.

19. The method of claim 17 wherein the desired air flow pattern across the expanse of said air outlet of said transverse fan assembly is a generally uniform flow of air across said expanse and wherein said aperture along said air chamber is so sized and located across and along the expanse of said air inlet to provide the infill of supplementary air from said supplementary air feed inlet into said air inlet to compensate for the deficiency in the air flow otherwise available at such location and necessary for the realization of the generally uniform flow of air across the expanse of said air outlet.

* * * * *